S. I. FEKETE.
TRANSMISSION LOCK.
APPLICATION FILED JULY 2, 1920.

1,382,183.

Patented June 21, 1921.
2 SHEETS—SHEET 2.

INVENTOR:
Stephen I. Fekete
by MacLeod, Calver, Copeland & Dike.
Attys

UNITED STATES PATENT OFFICE.

STEPHEN I. FEKETE, OF DETROIT, MICHIGAN, ASSIGNOR TO ESSEX MOTORS, OF DETROIT, MICHIGAN, A CORPORATION OF MICHIGAN.

TRANSMISSION-LOCK.

1,382,183. Specification of Letters Patent. Patented June 21, 1921.

Application filed July 2, 1920. Serial No. 393,683.

*To all whom it may concern:*

Be it known that I, STEPHEN I. FEKETE, a subject of the King of Hungary, residing at Detroit, county of Wayne, State of Michigan, have invented a certain new and useful Improvement in Transmission-Locks, of which the following is a specification, reference being had therein to the accompanying drawings.

My invention has for its object an improvement in transmission locks for motor vehicles which are provided with transmissions or change speed gears between the engine and the driving wheels. The invention is applicable particularly to those transmissions in which there is a sliding rod forming one of the agencies by which the change of gears is effected. The particular object of the invention is to provide a lock which shall be so simple and effective that it is not likely to get out of order and which will always be in condition for use and which can be locked by the operator with a minimum effort, it being well understood that a vehicle lock is more likely to be used if it is easily locked even if more effort is required to unlock it. Another object of the invention is to provide a lock, the keyhole of which will be always protected while the car is in use so that no dirt can enter it and also so constructed that the key cannot be left in the lock when the car is unlocked.

The invention will be fully understood from the following description when taken in connection with the accompanying drawings, and the novel features thereof will be pointed out and clearly defined in the claims at the close of this specification.

In the drawings, Figure 1 is a side elevation partly broken away of the control mechanism of a vehicle to which is applied the lock embodying my invention.

Fig. 4 is a view similar to Fig. 1 showing the device in unlocked position.

Figure 2:
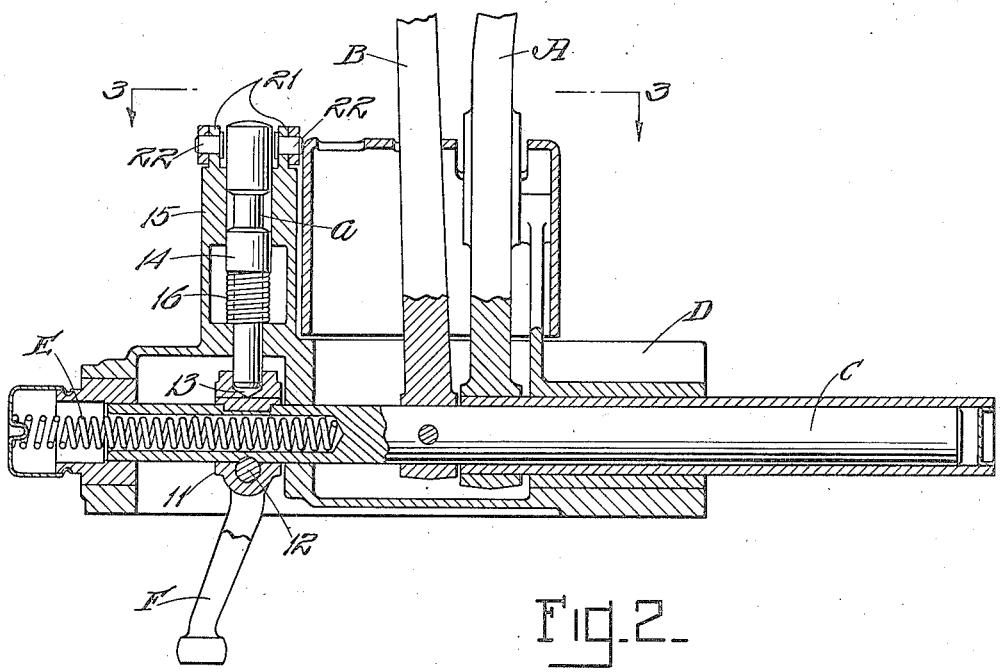
Fig. 2 is a section on line 2, 2 of Fig. 1.
Figure 3:
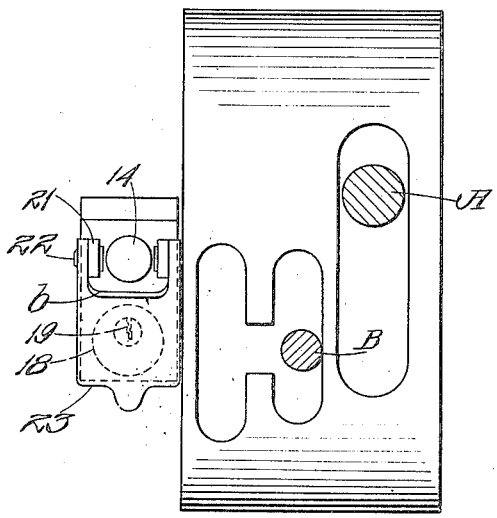
Fig. 3 is a section on line 3—3 of Fig. 2.

Referring now to the drawings, at A is shown a brake lever, at B a gear shift lever and at C the lever rod on which the gear shift lever is mounted and which is slidable in the housing D, being held normally to the right as shown in Fig. 2 by the spring E so that when the gears are in neutral the gear shift lever B will normally be in the position shown in Fig. 3. The lever rod C has secured to it the finger F for engagement with the fork rods of the transmission, said rods being of the ordinary construction and not shown in the drawings. The parts so far described are of the ordinary construction such as are found in one well-known type of control, and, therefore, need not be described in greater detail.

Figure 1:
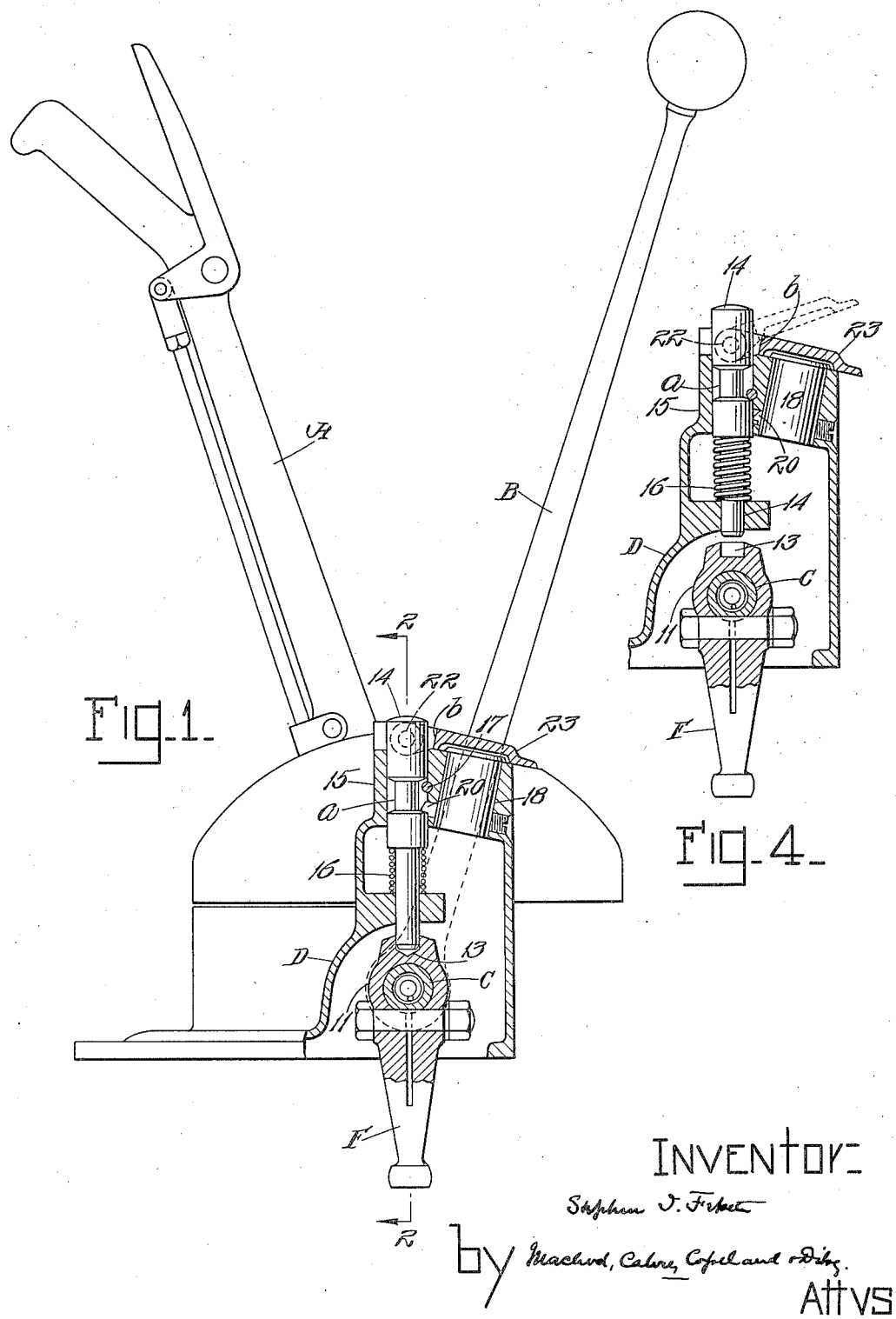

The finger F is formed with a hub 11 which surrounds the lever rod C and is secured thereto by the pin 12. In this hub there is formed a socket 13 (see Figs. 1, 2 and 4) capable of receiving the point of a coöperating locking pin 14 which is slidable vertically in a hole in a casing 15 formed integral with the housing D. The locking pin is held normally out of engagement with the said socket by a spring 16. The pin 14 is positioned with relation to the socket 13 so that the two are in line only when the gear shift lever is in the position indicated in Fig. 3, this being the position into which it is normally forced by the action of the spring E. The construction is, therefore, such that the gear shift lever can only be locked with the gears in neutral position. The portion *a* of the locking pin 14 is of smaller diameter than the adjacent portions and a pin 17 is provided which limits the movement of the locking pin in both directions.

At 18 is shown the barrel of a lock, the keyhole being designated 19 (see Fig. 3). This lock is provided with a spring actuated finger 20 in the well-known manner to engage the lower shoulder of the portion *a* of the locking pin 14 and prevent the locking pin rising under the action of the spring 16 when the device is locked.

At the top of the portion of the casing which contains the locking pin 14, two ears or lugs 21 are located directly opposite the center of the locking pin 14. To these two lugs is secured by pivot pins 22, a cover 23 which falls down over the keyhole 19 of the barrel 18 of the lock, and covers and protects it. The cover is formed so that the rear edge *b* which is located between the two legs, lies close to the pin when the cover is closed, and therefore if the pin is in its upper position, the cover cannot be lifted. This will be clearly seen from inspection of Fig. 4 where the cover slightly raised is shown in dotted line position.

The operation of the lock embodying my invention is as follows:—

As long as the car is unlocked, the locking pin 14 is in the raised position shown in Fig. 4 and therefore the cover 23 cannot be raised. The car is not locked when in operation nor ordinarily when standing in the garage. During these periods of time, the cover is securely held down and therefore the key cannot be left in the keyhole and hit and thus be bent or broken, nor can dirt enter the keyhole when the driver's compartment is cleaned out, nor by being scuffed into the keyhole by the driver. To lock the car it is only necessary to push down the pin until the lower shoulder of the locking pin is below the end of the tongue 20, which allows the tongue to catch on the shoulder and hold the pin down until released by moving the barrel of the lock. The pin is ordinarily pushed down to lock the car by stepping on it.

When the car is locked, the locking pin is down and its upper end is clear of the cover so that the cover can be lifted to unlock the car. In unlocking the car, the cover is lifted and the key inserted. When the lock is turned by the key, the locking pin is released and is pushed up by the spring 16 until its head strikes the cover which is then in lifted position. This movement of the pin is enough so that the end of the tongue 20 will then be below the shoulder of the locking pin and the tongue 20 is held in retracted position, while the key is being withdrawn. The key is then taken out of the lock, and the cover dropped to normal position, allowin the locking pin to rise as far as is permitted by the stop pin 17. This movement withdraws the end of the pin from the socket 13 and releases the gear shift.

From the foregoing, it will be seen that the keyhole is securely covered and protected against dirt except when the car is locked, at which time there is little likelihood that dirt will find its way into the keyhole. Even during this time, the keyhole is protected, as the cover is normally in closed in position.

What I claim is:—

1. The improved transmission locking device comprising a lock, a locking pin, a socket on a movable part of the transmission to coöperate with the pin, and a cover for the lock, said locking device having provision for holding said cover against movement to uncover said lock when said pin is out of engagement with said socket.

2. The improved transmission locking device comprising a lock, a locking pin, a socket on a movable part of the transmission to coöperate with the pin, and a cover for the lock hinged to the structure closely adjacent the pin and held thereby against movement to uncover the lock when said pin is in a position to disengage the socket.

3. The improved transmission locking device comprising a lock, a locking pin, a socket on a movable part of the transmission to coöperate with the pin, a spring to hold the pin normally out of engagement with the socket, a cover for the lock hinged to the structure adjacent the pin and held thereby against movement to uncover the lock when said pin is in a position to disengage the socket.

4. The improved transmission locking device comprising a transmission locking pin having a portion of reduced diameter, a lock having a tongue to engage said pin at said portion of reduced diameter, a cover for the lock hinged to the structure adjacent the pin and held thereby in a position to cover the lock when the pin is in released position, said pin being movable, when the cover is lifted and the lock turned, into a position to cause the tongue to engage the pin at a point beyond the portion of reduced diameter.

In testimony whereof I affix my signature.

STEPHEN I. FEKETE.